(12) United States Patent
Zimmerman (10) Patent No.: US 9,996,364 B2
(45) Date of Patent: Jun. 12, 2018

(54) VEHICLE USER INTERFACE ADAPTATION

(71) Applicant: Insitu, Inc., Bingen, WA (US)

(72) Inventor: James Bryan Zimmerman, Vancouver, WA (US)

(73) Assignee: Insitu, Inc., Bingen, WA (US)

( * ) Notice: Subject to any disclaimer, the term of this patent is extended or adjusted under 35 U.S.C. 154(b) by 748 days.

(21) Appl. No.: 14/453,311

(22) Filed: Aug. 6, 2014

(65) Prior Publication Data

US 2016/0364248 A1 Dec. 15, 2016

Related U.S. Application Data

(60) Provisional application No. 61/872,404, filed on Aug. 30, 2013.

(51) Int. Cl.
| | |
|---|---|
| G06F 9/44 | (2018.01) |
| G05D 1/00 | (2006.01) |
| G08G 5/00 | (2006.01) |
| G01C 21/36 | (2006.01) |
| G06F 3/0481 | (2013.01) |

(52) U.S. Cl.
CPC ....... G06F 9/4443 (2013.01); G01C 21/3664 (2013.01); G05D 1/0027 (2013.01); G05D 1/0044 (2013.01); G06F 3/0481 (2013.01); G08G 5/0034 (2013.01); G08G 5/0069 (2013.01); G08G 5/0082 (2013.01)

(58) Field of Classification Search
CPC ... G06F 9/4443; G05D 1/0027; G05D 1/0044
USPC .......... 244/190, 189, 175; 701/3, 14
See application file for complete search history.

(56) References Cited

U.S. PATENT DOCUMENTS

| | | | | |
|---|---|---|---|---|
| 8,082,102 | B2* | 12/2011 | Ravenscroft | G01C 21/005 701/2 |
| 8,626,361 | B2* | 1/2014 | Gerlock | G08G 5/0013 340/991 |
| 8,781,650 | B2* | 7/2014 | Downs | G05D 1/0027 701/117 |
| 9,269,929 | B2* | 2/2016 | Yi | H01M 2/022 |
| 9,317,036 | B2* | 4/2016 | Wang | G05D 1/0214 |
| 9,508,264 | B2* | 11/2016 | Chan | G08G 5/0043 |
| 9,513,125 | B2* | 12/2016 | Ravenscroft | G01C 21/005 |
| 2005/0216182 | A1* | 9/2005 | Hussain | G01C 21/20 701/532 |
| 2009/0210109 | A1 | 8/2009 | Ravenscroft | |
| 2009/0219393 | A1 | 9/2009 | Vian et al. | |

(Continued)

OTHER PUBLICATIONS

International Patent Application No. PCT/US2014/052961; The Int'l Search Report and the Written Opinion; dated May 8, 2015; 11 pages.

(Continued)

*Primary Examiner* — Christopher P Ellis
(74) *Attorney, Agent, or Firm* — Gates & Cooper LLP (57) ABSTRACT

Methods, devices, and systems are used for a vehicle user interface adaption system. In an example, operations may be effectuated that include displaying a graphical user interface including a first plurality of objects associated with a first unmanned aerial vehicle and receiving data that includes a message from the graphical user interface indicative of a selection of a second unmanned aerial vehicle. A second plurality of objects may be displayed based on the received data.

20 Claims, 8 Drawing Sheets

(56) References Cited

U.S. PATENT DOCUMENTS

2010/0017114 A1    1/2010   Tehan et al.
2012/0280087 A1   11/2012   Coffman et al.

OTHER PUBLICATIONS

International Patent Application No. PCT/US2014/052961; Int'l Preliminary Report on Patentability; dated Mar. 10, 2016; 8 pages.
Australian Examination Report dated Feb. 13, 2018 for Australian Patent Application No. 2014349140.

\* cited by examiner

VEHICLE USER INTERFACE ADAPTATION

CROSS-REFERENCE TO RELATED APPLICATIONS

This application claims benefit under 35 U.S.C. § 119(e) of U.S. Provisional Patent Application No. 61/872,404, filed on Aug. 30, 2013, the contents of which are hereby incorporated by reference herein.

BACKGROUND

Unmanned aerial vehicles (UAVs) may have a range of uses such as reconnaissance planes and combat-ready sensor and weapons platforms. A UAV may launch and execute a mission by flying to one or more points of interest along a predefined route. An operator may load the points of interest, including launch and landing location into the UAV, as a mission flight plan that the operator develops using a flight planner or ground control station with a graphical user interface. The flight path of the UAV may be tracked on a map.

SUMMARY

Disclosed are methods, devices, and systems for user interface adaptation. For example, there may be a method that includes displaying a graphical user interface including a first plurality of objects associated with a first unmanned aerial vehicle, receiving data that includes a message from the graphical user interface indicative of a selection of a second unmanned aerial vehicle, and responsive to receiving the data, displaying a second plurality of objects, the second plurality of objects based on the data.

In another example, there may be a system comprising a display, a processor communicatively connected with the display, and a memory coupled to the processor. The memory may have stored thereon executable instructions that when executed by the processor cause the processor to effectuate operations that include providing instructions to display a graphical user interface including a first plurality of objects associated with a first unmanned aerial vehicle, receiving data that includes a message from the graphical user interface indicative of a selection of a second unmanned aerial vehicle, and responsive to receiving the data, providing instructions to display a second plurality of objects, the second plurality of objects based on the data.

In another example, there may be a processor and a memory communicatively connected with the processor. The memory may have stored thereon executable instructions that when executed by the processor cause the processor to effectuate operations that include providing instructions to display a graphical user interface including a first plurality of objects associated with a first unmanned aerial vehicle, receiving data that includes a message from the graphical user interface indicative of a selection of a second unmanned aerial vehicle, and responsive to receiving the data, providing instructions to display a second plurality of objects, the second plurality of objects based on the data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EXAMPLES

Disclosed herein are methods, devices, and systems for automatic adaptation of a user interface. The adaptation may include displaying a plurality of objects based one or more factors. The objects may include points of interest such as a current location of the first UAV, the flight path of the first UAV, historical (e.g., previous) flight paths of the first UAV, launch and landing location of the first UAV, first UAV controls, contingency routes, and buildings of interest, among other things. The factors may include selection of a particular unmanned aerial vehicle, history of controlling an unmanned aerial vehicle, emergency alerts, time, waypoints, position of sensors, and the like.

Figure 1:
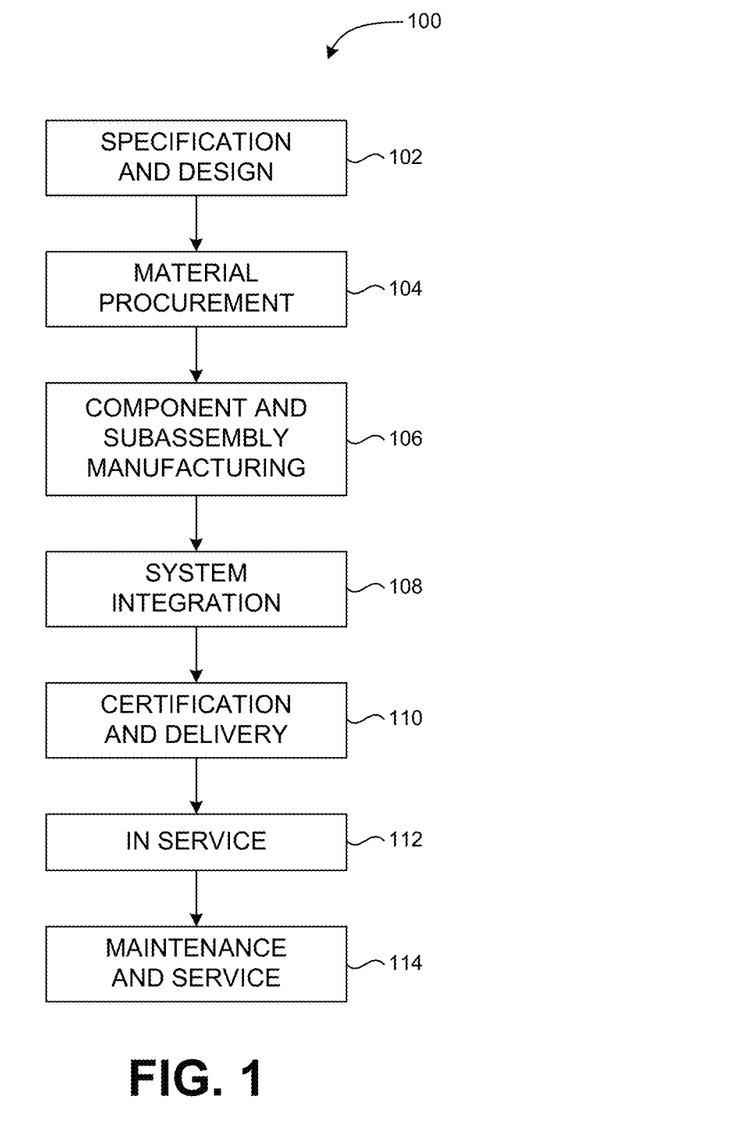
FIG. 1 depicts a flow diagram of an aircraft production and service methodology.
Figure 2:
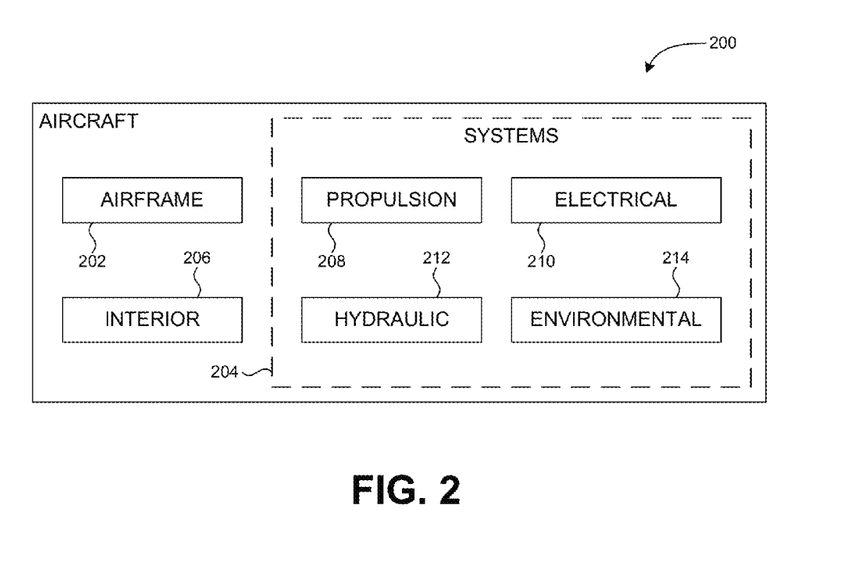
FIG. 2 depicts a block diagram of an aircraft.

Examples in this disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Figure 3:
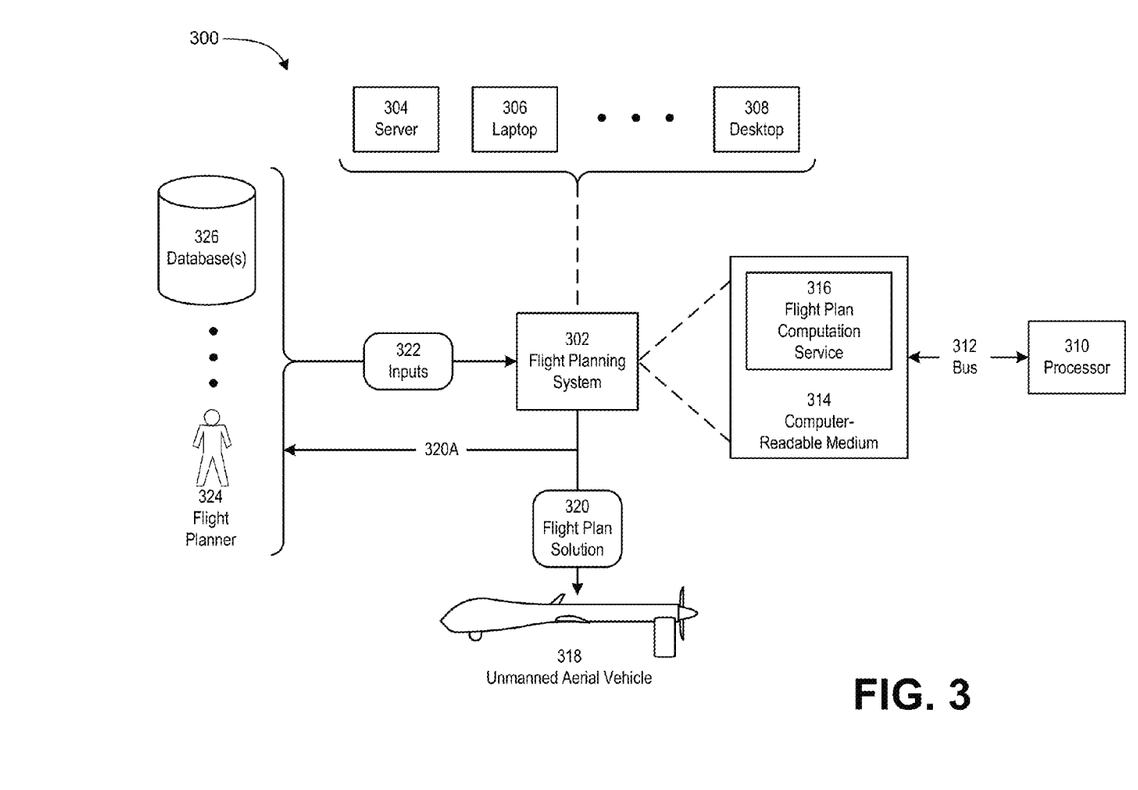
FIG. 3 depicts a block diagram illustrating systems or operating environments for controlling unmanned aerial vehicles (UAVs)

FIG. 3 illustrates systems or operating environments, denoted generally at 300, that provide flight plans for UAVs while routing around obstacles having spatial and temporal dimensions. These systems 300 may include one or more flight planning systems 302. FIG. 3 illustrates several examples of platforms that may host the flight planning system 302. These examples may include one or more server-based systems 304, one or more portable computing systems 306 (whether characterized as a laptop, notebook, tablet, or other type of mobile computing system), and/or one or more desktop computing systems 308. As detailed elsewhere herein, the flight planning system 302 may be a ground-based system that performs pre-flight planning and route analysis for the UAVs, or may be a vehicle-based system that is housed within the UAVs themselves.

Implementations of this description may include other types of platforms as well, with FIG. 3 providing non-limiting examples. For example, the description herein contemplates other platforms for implementing the flight planning systems, including but not limited to wireless personal digital assistants, smartphones, or the like. The graphical elements used in FIG. 3 to depict various components are chosen only to facilitate illustration, and not to limit possible implementations of the description herein.

Turning to the flight planning system 302 in more detail, it may include one or more processors 310, which may have a particular type or architecture, chosen as appropriate for particular implementations. The processors 310 may couple to one or more bus systems 312 that are chosen for compatibility with the processors 310.

The flight planning systems 302 may include one or more instances of computer-readable storage media 314, which couple to the bus systems 312. The bus systems may enable the processors 310 to read code and/or data to/from the computer-readable storage media 314. The media 314 may represent storage elements implemented using any suitable technology, including but not limited to semiconductors, magnetic materials, optics, or the like. The media 314 may include memory components, whether classified as RAM, ROM, flash, or other types, and may also represent hard disk drives.

The storage media 314 may include one or more modules 316 of instructions that, when loaded into the processor 310 and executed, cause the server 302 to provide flight plan computation services for a variety of UAVs 318. These modules may implement the various algorithms and models described and illustrated herein.

The UAVs 318 may be of any convenient size and/or type as appropriate for different applications. In different scenarios, the UAVs may range from relatively small drones to relatively large transport aircraft. Accordingly, the graphical illustration of the UAV 318 as shown in FIG. 1 is representative only, and is not drawn to scale.

The flight plan services 316 may generate respective flight plan solutions 320 for the UAVs 318 based on inputs 322, with flight planning personnel 324 and/or one or more databases 326 providing inputs 322.

Assuming that the flight plan services 316 define one or more solutions 320, the flight planning system 302 may load the solutions into the UAVs 318, as represented by the arrow connecting blocks 302 and 318 in FIG. 3. In addition, the flight planning system 302 may also provide the solutions 320 to the flight planner 324 and/or the databases 326, as denoted by the arrow 320A.

Figure 4:
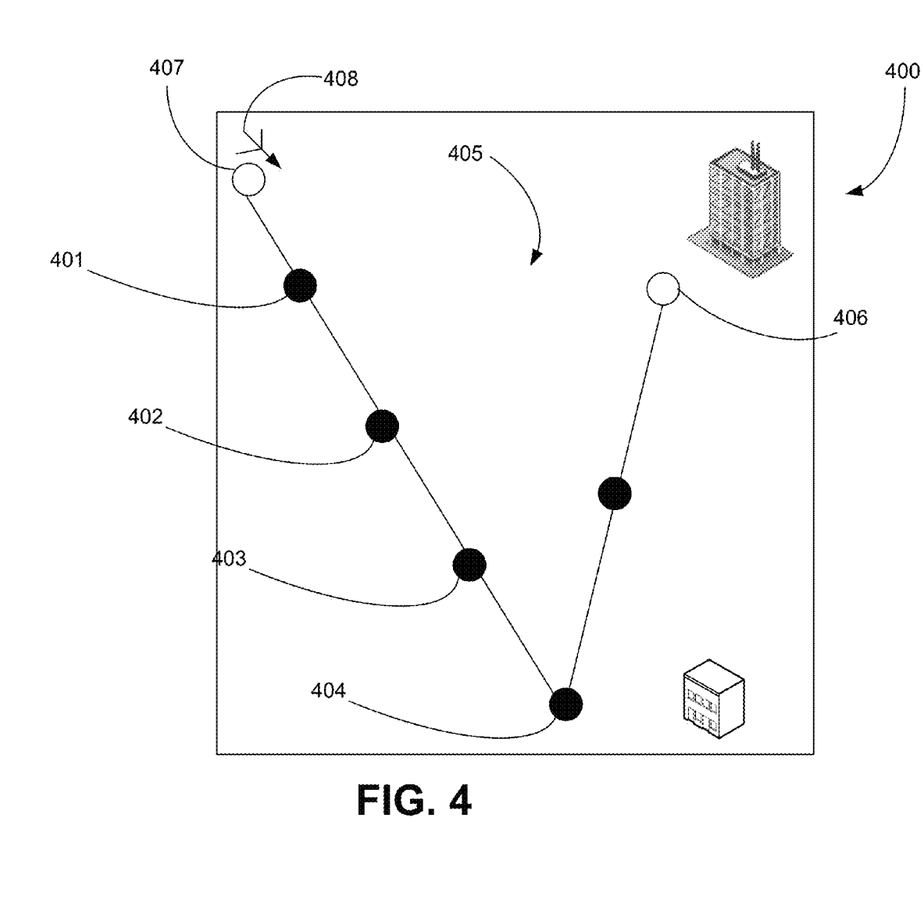
FIG. 4 is an illustration of an example map associated with a UAV.

FIG. 4 is an illustration of an example map 400 associated with a UAV 408. In an example, a display or graphical user interface (GUI) may show map 400 of a geographic region including points of interest, and UAV flight path 405 based on a selection of UAV 408. UAV 408 is a fixed wing aerial vehicle that travels along UAV flight path 405. UAV flight path 405 has multiple waypoints between the launch site 407 and destination site 406, such as waypoint 401, waypoint 402, waypoint 403, and waypoint 404. During the flight of UAV 408, map 400 may show a current location of UAV 408, the flight path of UAV 408, historical (i.e., previous) flights of UAV 408, launch and landing location of UAV 408, buildings of interest, and flight paths of other UAVs, among other things. The points of interest may be represented by simple geometric shapes, bitmap pictures, or the like. Next to each point of interest there may be text including information associated with the point of interest, such as altitude of UAV 408, speed of UAV 408, or a name of a launch site (e.g., "Launch Site Delta"). A user may control UAV 408 (e.g., speed and altitude) as well as sensors and other equipment attached to UAV 408.

Figure 5:
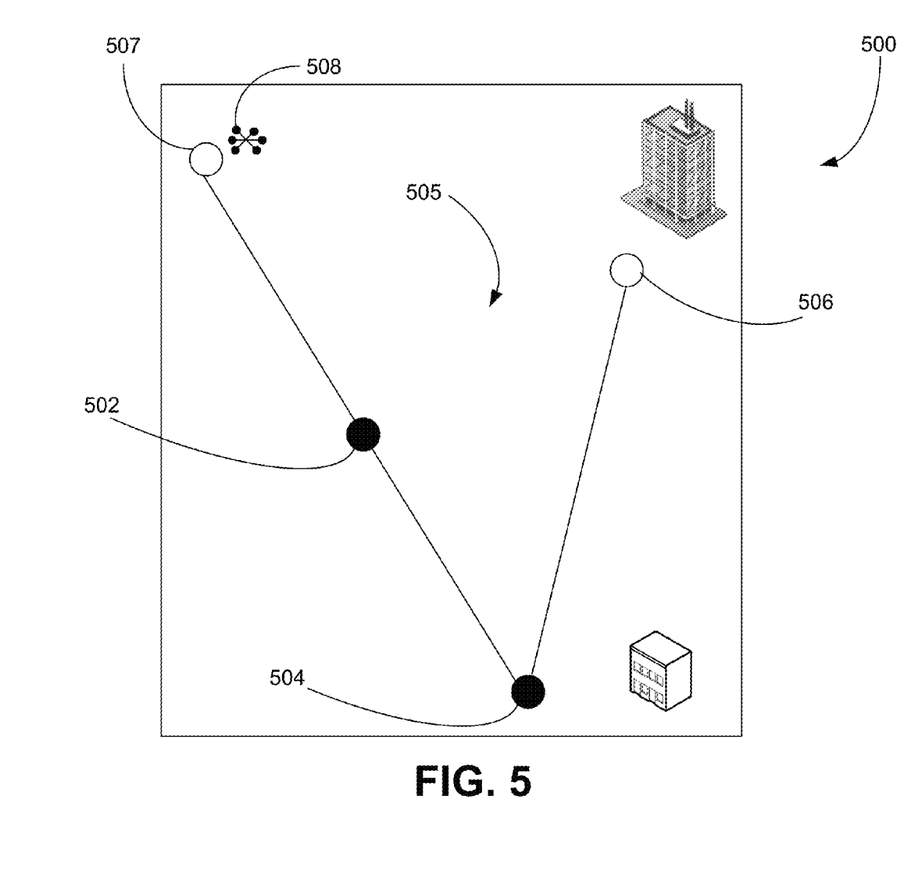
FIG. 5 illustrates an example map associated with a UAV.

FIG. 5 is an illustration of an example interface display 500 associated with a UAV 508. In an example, a display may show a map 500 of a geographic region including points of interest and UAV flight path 505 based on a selection of UAV 508. UAV 508 is a rotorcraft that travels along UAV flight path 505. UAV flight path 505 has multiple waypoints between the launch site 507 and destination site 506, such as waypoint 502 and waypoint 504. The display and controls associated with UAV 508 may be similar to display and controls associated with UAV 408.

Figure 6:
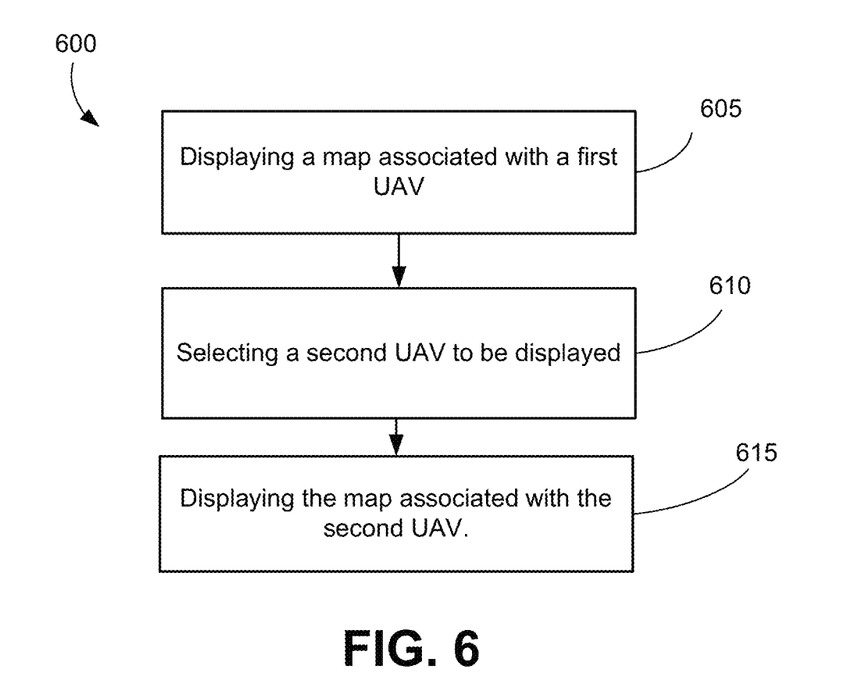
FIG. 6 illustrates an example method for user interface adaption associated with a UAV.

FIG. 6 illustrates an example method 600 for user interface adaptation. At block 605, a plurality of objects associated with a first UAV is displayed on a map of a region. The objects may include points of interest such as a current location of the first UAV, the flight path of the first UAV, historical (e.g., previous) flight paths of the first UAV, launch and landing location of the first UAV, first UAV controls, contingency routes, and buildings of interest, among other things. At block 610, a second UAV may be selected for display or control. At block 615, responsive to a device receiving and indication that the second UAV has been selected for display or control, an appropriate map may be automatically displayed for the second UAV. The map may show just the objects related with the second UAV.

In an example, UAV 408 and UAV 508 may travel from the same launch site to the same destination site along the same general path. A user may have selected UAV 408 which is associated with a fixed wing aerial vehicle. Map 400 may be shown after UAV 408 is selected. Map 400 may be automatically adapted with appropriate UAV 408 specific controls and appearance. If the user then selects UAV 508 (a rotorcraft), the display (the same display device that showed map 400) may change to show map 500 instead of map 400. Map 500 may be automatically adapted with appropriate UAV 508 specific controls and appearance. For example, appropriate controls and appearance for the UAVs may include waypoints. UAV 508 and UAV 408 may have different restrictions regarding the distance and therefore amount of waypoints along a route. A comparison of map 400 and map 500 in view of the current example shows that although UAV 508 and UAV 408 travel the same route, UAV 408 requires more waypoints along the route.

In other examples, appropriate displayed controls or appearance of objects in a UAV associated map may be based on one or more of the following parameters: maintenance history of the UAV, flight history of the UAV, vehicle model (e.g., different models of a rotorcraft), time thresholds (e.g., most recent executed flight paths), an emergency, weather, and a UAV sensor detecting a particular object (e.g., a building), among other things. In an example, appropriate displayed controls or appearance of objects may be based on a history of previously controlled UAVs. The history may include errors in handling/controlling the previous UAVs, common emergency situations, and efficiency in completing objectives (e.g., arriving at a point in a certain amount of time). For example, a user may have previously controlled a first UAV and a second UAV. When a user selects a third UAV to control, based on the analysis of the history, the controls or appearance may be adapted to the first UAV, the second UAV, the now selected third UAV, or a combination of the first, second, or third UAV. The history may be connected with a user (e.g., associated username), user interface (e.g., a terminal), or the like.

In an example, there may be a first UAV that is a non-emergency state and a second UAV in an emergency state. The second UAV may already be in flight or may be launched as a result of the emergency. The emergency may be a search and rescue mission or engaging an enemy combatant, for example. The first UAV and the second UAV may be nearly identical except for the emergency state of the second UAV. Objects may be automatically removed from or added to the map displayed on a GUI based on an alert indicative of an emergency situation.

Figure 7:
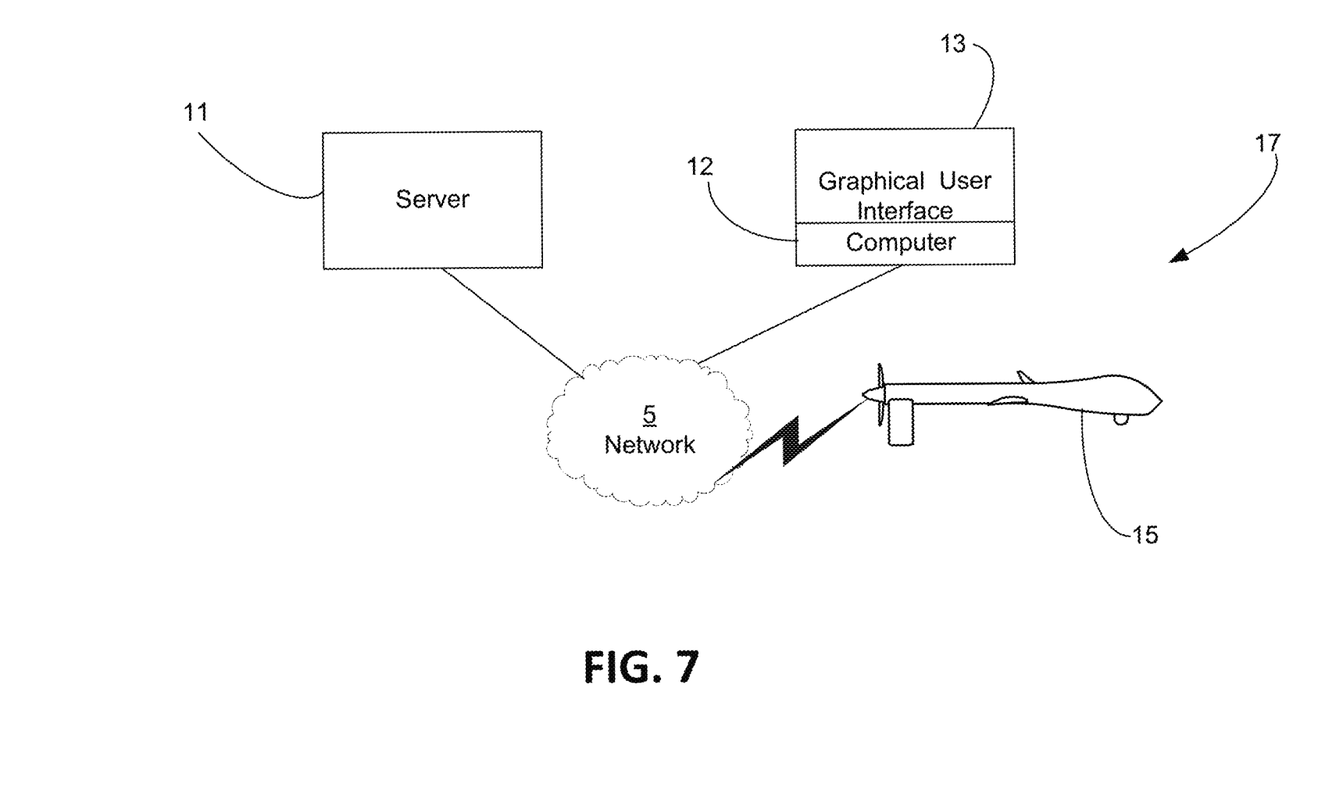
FIG. 7 illustrates an example vehicle user interface adaption system.

FIG. 7 illustrates an example vehicle user interface adaption system 17. Network 5 may communicatively connect server 11, computer 12, and UAV 15. GUI 13 is connected with local computer 12 that helps generate GUI 13. In an example, server 11 may receive and process information about one or more UAVs, such as UAV 15. Server 11 transmits data that helps identify the type of vehicle (e.g., metadata) that identifies the type of vehicle to computer 12. Computer 12 determines which adapters (plugin-supplied software) should be applied based on the type of UAV. The adapters provide instructions to use Adapt IDs to add, remove, replace, or modify parts of GUI 13 for a selected vehicle type. A plurality of unique Adapt ID's is assigned to positively identify the plurality of parts that compose the Graphical User Interface. An Adapt ID may be used in a plurality of ways by a plurality of adapters to adapt GUI 13 to be appropriate for use with plurality of vehicle types.

Plug-ins may be used to update or change the adaption functionality on computer 12, without modifying the core functionality of an adaptation service executed on computer 12. In an example, before any GUI control element is displayed, a runtime mechanism may look up and apply any registered adaptation service for the kind of vehicle or other parameter that is currently selected in the system so the correctly-adapted user interface is displayed. For example, the adaptation service may be configured such that computer 12 receives one or more messages. A message may be indicative of a vehicle type of a UAV, indicative of a model of a UAV, indicative of a history of a previously controlled UAV by the GUI, indicative of a history of a UAV previously controlled by a user using the GUI, indicative of an emergency associated with a UAV, indicative of a time threshold, indicative of a maintenance history of a UAV, indicative of a UAV arriving at a waypoint, or indicative of a UAV sensing an object. Computer 12 may determine the appropriate user interface functionality and appearance based on the selected UAV and/or additional parameters.

Figure 8:
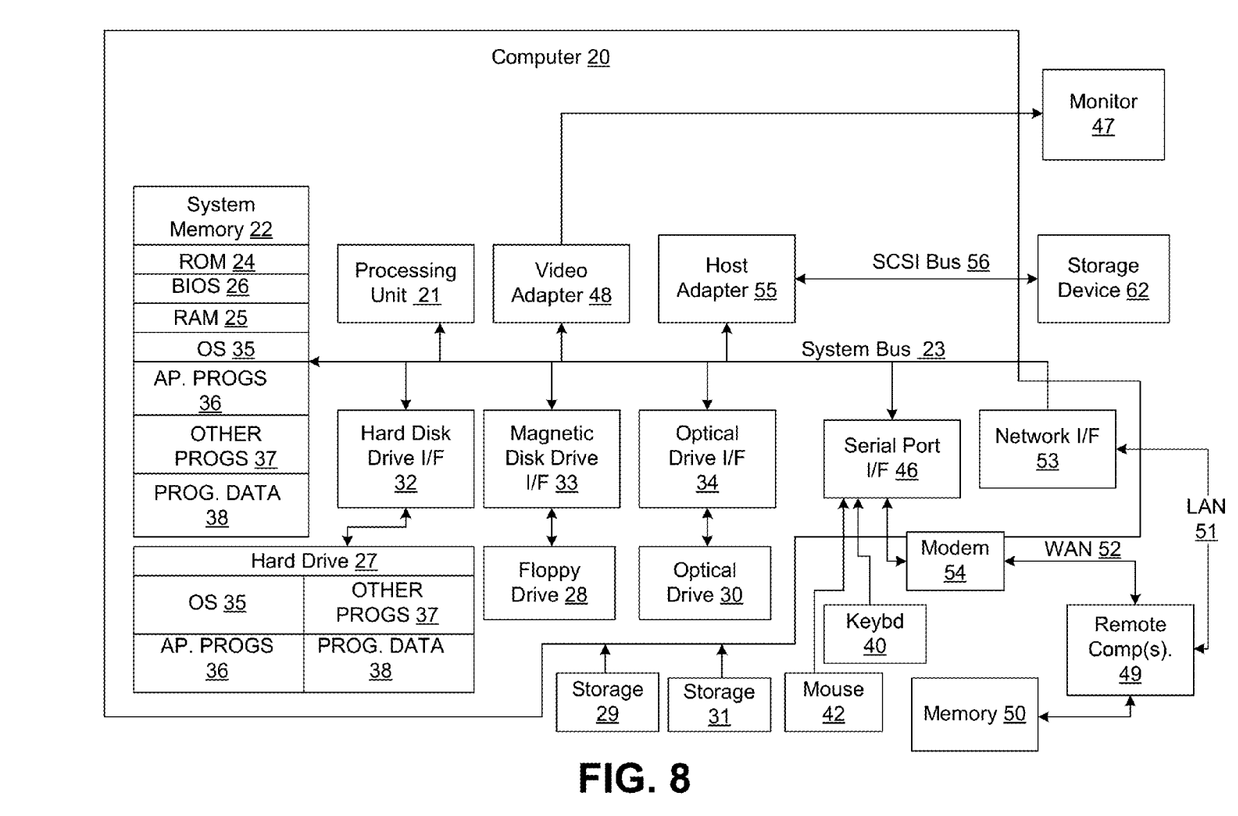
FIG. 8 is an example block diagram representing a general purpose computer system in which aspects of the methods and systems disclosed herein or portions thereof may be incorporated.

FIG. 8 and the following discussion are intended to provide a brief general description of a suitable computing environment in which the methods and systems disclosed herein and/or portions thereof may be implemented. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 8 is a block diagram representing a general purpose computer system in which aspects of the methods and systems disclosed herein and/or portions thereof may be incorporated. As shown, the example general purpose computing system includes a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the computer 20, such as during start-up, is stored in ROM 24.

The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20. As described herein, computer-readable media is a tangible, physical, and concrete article of manufacture and thus not a signal per se.

Although the example environment described herein employs a hard disk, a removable magnetic disk 29, and a removable optical disk 31, it should be appreciated that other types of computer readable media which can store data that is accessible by a computer may also be used in the example operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, a computer may include other peripheral output devices (not shown), such as speakers and printers. The example system of FIG. 8 also includes a host adapter 55, a Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be a personal computer, a server, a router, a network PC, a peer device or other common network node, and may include many or all of the elements described above relative to the computer 20, although only a memory storage device 50 has been illustrated in FIG. 8. The logical connections depicted in FIG. 8 include a local area network (LAN) 51 and a wide area network (WAN) 52. Such networking environments are commonplace in offices, enterprise-wide computer networks, intranets, and the Internet.

When used in a LAN networking environment, the computer 20 is connected to the LAN 51 through a network interface or adapter 53. When used in a WAN networking environment, the computer 20 may include a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are example and other means of establishing a communications link between the computers may be used.

Computer 20 may include a variety of computer readable storage media. Computer readable storage media can be any available media that can be accessed by computer 20 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. The communications paths described herein may be wired or wireless. The systems and subsystems discussed herein may be distributed or integrated into one device. Although UAVs are discussed the examples disclosed herein may also apply to other vehicles and adaption may be based on whether the vehicle is an air, land, sea, or subsurface vehicle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method for configuring a graphical user interface, the method comprising:

displaying, by a display device, a graphical user interface including a first plurality of objects associated with controls and appearance adapted for a first unmanned aerial vehicle;

receiving data, the data including a message from the graphical user interface indicative of a selection of a second unmanned aerial vehicle; and responsive to receiving the data, automatically adapting information displayed on the graphical user interface to display a second plurality of objects, the second plurality of objects adapted with controls and appearance specific to the second unmanned aerial vehicle;

wherein the automatically adapted information is determined at least in part based on at least one of a history of one or more unmanned aerial vehicles previously controlled by the graphical user interface and a user history of one or more unmanned aerial vehicles previously controlled by the user using the graphical user interface.

2. The method of claim 1, wherein the data further comprises at least one of the following:

a message indicative of a vehicle type of the second unmanned aerial vehicle; or a message indicative of a model of the second unmanned aerial vehicle.

3. The method of claim 1, wherein the data further comprises at least one of the following:
a message indicative of an emergency associated with the second unmanned aerial vehicle;
a message indicative of a time threshold;
a message indicative of maintenance history of the second unmanned aerial vehicle;
a message indicative of the second unmanned aerial vehicle arriving at a waypoint; or
a message indicative of the second unmanned aerial vehicle sensing one of the first plurality of objects.

4. The method of claim 1, further comprising:
responsive to receiving the data, changing a maximum number of waypoints or a minimum number of waypoints that can be configured for the second unmanned aerial vehicle in relation to the first unmanned aerial vehicle.

5. The method of claim 1, wherein the second plurality of objects comprises a subset of the first plurality of objects.

6. The method of claim 5, wherein the subset of the first plurality of objects comprises contingency routes.

7. A system comprising:
a display;
a processor communicatively connected with the display; and
a memory coupled to the processor, the memory having stored thereon executable instructions that when executed by the processor cause the processor to effectuate operations comprising:
providing instructions to display a graphical user interface including a first plurality of objects associated with controls and appearance adapted for a first unmanned aerial vehicle;
receiving data, the data including a message from the graphical user interface indicative of a selection of a second unmanned aerial vehicle; and
responsive to receiving the data, providing instructions to automatically adapt information displayed on the graphical user interface to display a second plurality of objects, the second plurality of objects adapted with controls and appearance specific to the second unmanned aerial vehicle;
wherein the automatically adapted information is determined at least in part based on at least one of a history of one or more unmanned aerial vehicles previously controlled by the graphical user interface and a user history of one or more unmanned aerial vehicles previously controlled by the user using the graphical user interface.

8. The system of claim 7, wherein the data further comprises at least one of the following:
a message indicative of a vehicle type of the second unmanned aerial vehicle; or
a message indicative of a model of the second unmanned aerial vehicle.

9. The system of claim 7, wherein the data further comprises at least one of the following:
a message indicative of an emergency associated with the second unmanned aerial vehicle;
a message indicative of a time threshold;
a message indicative of maintenance history of the second unmanned aerial vehicle;
a message indicative of the second unmanned aerial vehicle arriving at a waypoint; or
a message indicative of the second unmanned aerial vehicle sensing one of the first plurality of objects.

10. The system of claim 7, wherein the memory further comprises instructions that when executed by the processor cause the processor to effectuate operations comprising:
responsive to receiving the data, changing a maximum number of waypoints or a minimum number of waypoints that can be configured for the second unmanned aerial vehicle in relation to the first unmanned aerial vehicle.

11. The system of claim 7, wherein the second plurality of objects comprises a subset of the first plurality of objects.

12. A device comprising:
a processor; and
a memory coupled to the processor, the memory having stored thereon executable instructions that when executed by the processor cause the processor to effectuate operations comprising:
providing instructions to display a graphical user interface including a first plurality of objects associated with controls and appearance adapted for a first unmanned aerial vehicle;
receiving data, the data including a message from the graphical user interface indicative of a selection of a second unmanned aerial vehicle; and
responsive to receiving the data, providing instructions to automatically adapt information displayed on the graphical user interface to display a second plurality of objects, the second plurality of objects adapted with controls and appearance specific to the second unmanned aerial vehicle;
wherein the automatically adapted information is determined at least in part based on at least one of a history of one or more unmanned aerial vehicles previously controlled by the graphical user interface and a user history of one or more unmanned aerial vehicles previously controlled by the user using the graphical user interface.

13. The device of claim 12, wherein the data further comprises at least one of the following:
a message indicative of a vehicle type of the second unmanned aerial vehicle; or
a message indicative of a model of the second unmanned aerial vehicle.

14. The device of claim 12, wherein the data further comprises at least one of the following:
a message indicative of an emergency associated with the second unmanned aerial vehicle;
a message indicative of a time threshold;
a message indicative of maintenance history of the second unmanned aerial vehicle; or
a message indicative of the second unmanned aerial vehicle arriving at a waypoint.

15. The device of claim 12, wherein the memory further comprises instructions that when executed by the processor cause the processor to effectuate operations comprising:
responsive to receiving the data, changing a maximum number of waypoints or a minimum number of waypoints that can be configured for the second unmanned aerial vehicle in relation to the first unmanned aerial vehicle.

16. The device of claim 12, wherein the second plurality of objects comprises a subset of the first plurality of objects.

17. The device of claim 12, wherein the data further comprises a message indicative of the second unmanned aerial vehicle sensing one of the first plurality of objects.

18. The method of claim 1, wherein:

at least one of a history of one or more unmanned aerial vehicles previously controlled by the graphical user interface and a user history of one or more unmanned aerial vehicles previously controlled by the user using the graphical user interface is included in the received data and is received as a message via a plug-in in an adaptive service implementing the graphical user interface; and the plug-in adapter service determines which plug-ins are applied in the graphical user interface based on a type of unmanned aerial vehicle.

19. The system of claim 7, wherein the at least one of a history of one or more unmanned aerial vehicles previously controlled by the graphical user interface and a user history of one or more unmanned aerial vehicles previously controlled by the user using the graphical user interface is included in the received data and is received as a message via a plug-in in an adaptive service implementing the graphical user interface; and the plug-in adapter service determines which plug-ins are applied in the graphical user interface based on a type of unmanned aerial vehicle.

20. The device of claim 12, wherein the at least one of a history of one or more unmanned aerial vehicles previously controlled by the graphical user interface and a user history of one or more unmanned aerial vehicles previously controlled by the user using the graphical user interface is included in the received data and is received as a message via a plug-in in an adaptive service implementing the graphical user interface; and the plug-in adapter service determines which plug-ins are applied in the graphical user interface based on a type of unmanned aerial vehicle.

\* \* \* \* \*